US012659663B2

(12) United States Patent
Ames

(10) Patent No.: US 12,659,663 B2
(45) Date of Patent: Jun. 16, 2026

(54) TIME ALIGNING LOUDSPEAKER DRIVERS IN A MULTI-DRIVER SYSTEM

(71) Applicant: Garmin International, Inc., Olathe, KS (US)

(72) Inventor: Nicholas C. Ames, Tempe, AZ (US)

(73) Assignee: Garmin International, Inc., Olathe, KS (US)

( * ) Notice: Subject to any disclaimer, the term of this patent is extended or adjusted under 35 U.S.C. 154(b) by 122 days.

(21) Appl. No.: 18/545,366

(22) Filed: Dec. 19, 2023

(65) Prior Publication Data

US 2024/0223949 A1 Jul. 4, 2024

Related U.S. Application Data

(60) Provisional application No. 63/478,259, filed on Jan. 3, 2023.

(51) Int. Cl.
*H04S 7/00* (2006.01)
*H04R 1/22* (2006.01)
*H04R 3/12* (2006.01)

(52) U.S. Cl.
CPC ................. *H04R 3/12* (2013.01); *H04R 1/22* (2013.01); *H04S 7/30* (2013.01)

(58) Field of Classification Search
CPC .. H04R 3/12; H04R 1/22; H04S 7/301; H04S 7/303; H04S 7/305; H04S 7/307; H04S 7/30
See application file for complete search history.

(56) References Cited

U.S. PATENT DOCUMENTS 4,450,322 A * 5/1984 Wilson ..................... H04R 1/02 381/387
6,901,148 B2 5/2005 Yoshino et al.
7,382,888 B2 6/2008 Aylward et al.
7,729,790 B1 6/2010 Hand et al.
8,175,284 B2 5/2012 Goldberg et al.
(Continued)

FOREIGN PATENT DOCUMENTS

WO 2016209098 A1 12/2016
WO 2020175174 A1 9/2020

OTHER PUBLICATIONS

La Roda, Joan, Technical Report—Phase Alignment Between Subwoofers and Mid-High Cabinets, DAS Audio, Engineering Department, 2009.

*Primary Examiner* — Disler Paul
(74) *Attorney, Agent, or Firm* — Samuel M. Korte; Max M. Ali; Kathleen D. Fitterling

(57) ABSTRACT

A method for phase alignment of audio signals using a first impulse response signal associated with a first frequency range and a second impulse response signal associated with a second frequency range is provided. The method includes determining a first start time for the first impulse response and a second start time for the second impulse response. The method further includes determining a delay based at least in part on a difference between the second start time and the first start time. The method further includes adjusting at least one audio signal phase for a first audio driver operating in the first frequency range with respect to a second audio driver operating in the second frequency range, where the adjusting of the at least one audio signal phase is based at least in part on the determined delay.

15 Claims, 8 Drawing Sheets

(56) References Cited

U.S. PATENT DOCUMENTS

| | | | | |
|---|---|---|---|---|
| 8,199,921 | B2 | 6/2012 | Katayama et al. | |
| 8,559,655 | B2 | 10/2013 | Mihelich et al. | |
| 9,363,618 | B2 | 6/2016 | Ma | |
| 10,097,939 | B2 | 10/2018 | Sheen et al. | |
| 10,104,470 | B2 | 10/2018 | Kon | |
| 10,805,726 | B1 | 10/2020 | Ryan et al. | |
| 10,937,435 | B2 | 3/2021 | Fueg et al. | |
| 11,172,321 | B2 | 11/2021 | Liu et al. | |
| 11,457,327 | B2 * | 9/2022 | Griffiths | G06F 3/04847 |
| 11,924,625 | B2 * | 3/2024 | Zheng | H04R 5/04 |
| 11,985,494 | B2 * | 5/2024 | Pham | H04S 7/302 |
| 12,192,737 | B2 * | 1/2025 | Snook | G10L 21/057 |
| 2006/0050896 | A1 | 3/2006 | Sung | |
| 2012/0033829 | A1 | 2/2012 | Lewis | |
| 2021/0281947 | A1 | 9/2021 | Han | |
| 2021/0400387 | A1 | 12/2021 | Hashimoto et al. | |
| 2022/0095065 | A1 | 3/2022 | Gault | |
| 2024/0223983 | A1 | 7/2024 | Mouzakis et al. | |

* cited by examiner

Column A1 - "True Delay"

The summed magnitude Response when delay time is measured via "True Delay" method compared to the ideal summed target magnitude response Column B1 - "Calibrated True Delay"

The summed magnitude Response when delay time is measured via "Calibrated True Delay" method compared to the ideal summed target magnitude response

TIME ALIGNING LOUDSPEAKER DRIVERS IN A MULTI-DRIVER SYSTEM

CROSS-REFERENCE TO RELATED APPLICATION

This application is related to and claims priority to U.S. Provisional Application No. 63/478,259, filed Jan. 3, 2023, entitled TIME ALIGNING LOUDSPEAKER DRIVERS IN A MULTI-DRIVER SYSTEM, the entire contents of which is incorporated herein by reference.

TECHNICAL FIELD

This disclosure relates audio reproduction and in particular to a method and system for phase alignment of loudspeakers in audio systems.

INTRODUCTION

Existing audio systems, e.g., for home theaters, vehicles, boats, etc., may include multiple speakers and associated audio drivers, such as subwoofer speakers, midbass speakers, midrange speakers, high-range speakers (tweeters), main speakers, etc. These speakers and/or audio drivers may be physically separated in space. Each of these speakers and/or audio drivers may be configured to produce audio within a respective frequency spectrum.

Existing systems may be configured for aligning the timing and/or phase of these multiple speakers, so that the playback on the speakers is time-aligned and/or phase-aligned in the ear of the listener. Existing systems typically utilize impulse responses for this purpose.

A "model" impulse response may define an ideal, target, and/or objectively correct and/or minimum phase difference/alignment between an example midbass and subwoofer speakers. For example, for some model impulse responses, the phase response of the subwoofer may seamlessly blend into the phase response of the midbass, i.e., there is no abrupt change in slope angle between the phase responses of the midbass and the subwoofer. For example, the target/model magnitude responses (also referred to as a "frequency response") may include a crossover region where both subwoofer and midbass are active.

The magnitudes of the impulse responses may be controlled/adjusted/modified/etc. using equalizer (EQ) techniques. For example, a (measured) subwoofer impulse response may be equalized (EQd) so as to ensure proper response shape (e.g., to modify the shape of the measured impulse response to conform more closely to the shape of the model/target impulse response). As an example, ten EQ bands may be used for adjusting the frequency response so that it more closely matches the target response. Similarly, EQ filters may be applied to the measured midbass impulse response. The particular details of EQ algorithms are beyond the scope of the present disclosure. The target/model impulse response may be compared with measured impulse responses of subwoofer and midrange magnitude responses to determine accuracy.

Some existing systems perform a phase adjustment procedure which may suffer from various drawbacks.

For example, in some existing systems, delay finding methods (e.g., peak finder methods) only function properly under certain limited conditions. For example, the measured speaker may require significant high frequency energy, and the system may malfunction in the presence of room/environment-induced acoustic reflections. Thus, using conventional delay finders for aligning spectral crossovers may not function accurately or properly, especially where there is crossover, e.g., from the subwoofer and main system (e.g., in a studio setting), or where subwoofer/midbass crossovers occur (e.g., in active home or vehicle systems). Typically, this may result in inaccuracy of the measured delay values, which may be further compounded due to reflected energy in rooms, cars, etc.

For example, an example subwoofer impulse response and the midbass impulse response may be measured over time, where the peaks are measured by conventional delay finders. The measured peak for the subwoofer impulse response may be, as an example, 15.94 ms, and the measured peak for the midbass impulse response may be, as an example, 32.68 ms.

Existing systems for phase alignment may suffer from acoustic output being perceived (e.g., subjectively by a human listener) as degraded. Furthermore, existing systems may exhibit "seamlessness" in which the subwoofer "blends" with the main speakers (e.g., the midbass or other speakers). The magnitude response in dB and relative phase response in degrees are examples of objective mechanisms which may be used to assess whether an ideal alignment has been achieved.

Thus, existing systems may not be sufficient or accurate for adjusting the timing and/or phase relationship of two or more audio drivers and/or speakers.

SUMMARY

Some embodiments advantageously provide a method and system for phase alignment in an audio system.

Some embodiments of the present disclosure may provide techniques for achieving a desired target timing/phase relationship between active drivers in a multiway/multi-speaker/multi-audio driver system. Just as equalizers are used to match the speakers' frequency response (e.g., the in-room response, the in-car response, etc.) to a target response, embodiments of the present disclosure may provide a target impulse response to correctly align the timing relationships between audio drivers.

According to a first aspect of the present disclosure, a method for phase alignment of audio signals using a first impulse response signal associated with a first frequency range and a second impulse response signal associated with a second frequency range is provided. The method includes determining a first start time for the first impulse response and a second start time for the second impulse response, determining a delay based at least in part on a difference between the second start time and the first start time, and adjusting at least one audio signal phase for a first audio driver operating in the first frequency range with respect to a second audio driver operating in the second frequency range, the adjusting of the at least one audio signal phase being based at least in part on the determined delay.

According to one or more embodiments of this aspect, the method further includes equalizing a magnitude of the first impulse response and a magnitude of the second impulse response prior to determining the delay.

According to one or more embodiments of this aspect, the delay is further determined based on a difference between the first start time and a reference start time of a model impulse response associated with at least one of the first frequency range and the second frequency range.

According to one or more embodiments of this aspect, the first frequency range is a subwoofer frequency range, and the second frequency range is a midrange frequency range.

According to one or more embodiments of this aspect, the method further includes generating a first reference audio signal associated with the first frequency range for playback on a first loudspeaker associated with the first audio driver and a second reference audio signal associated with the second frequency range for playback on a second loudspeaker associated with the second audio driver, and measuring the playback of the first loudspeaker to determine the first impulse response and measuring the playback of the second loudspeaker to determine the second impulse response.

According to one or more embodiments of this aspect, the determining of the first start time of the first impulse response signal includes determining a baseline noise level associated with the first frequency range, and detecting, at the first start time, a rise in the first impulse response signal over the baseline noise level, the rise being at least as large as a predetermined threshold value.

According to one or more embodiments of this aspect, the determining of the first start time of the first impulse response signal includes determining a baseline noise level associated with the first frequency range, and detecting, at the first start time, a rise in the first impulse response signal over the baseline noise level, the rise being at least as large as a predetermined threshold value.

According to another aspect of the present disclosure, a system for phase alignment of audio signals using a first impulse response signal associated with a first frequency range and a second impulse response signal associated with a second frequency range is provided. The system includes a calibration device configured to determine a first start time for the first impulse response and a second start time for the second impulse response, determine a delay based at least in part on a difference between the second start time and the first start time, and transmit a configuration to a receiver indicating the delay. The system further includes a receiver configured to receive the configuration from the calibration device, and responsive to receiving the configuration, adjust at least one audio signal phase for a first audio driver operating in the first frequency range with respect to a second audio driver operating in the second frequency range, the adjusting of the at least one audio signal phase being based at least in part on the delay.

According to one or more embodiments of this aspect, the calibration device is further configured to equalize a magnitude of the first impulse response and a magnitude of the second impulse response prior to determining the delay.

According to one or more embodiments of this aspect, the delay is further determined based on a difference between the first start time and a reference start time of a model impulse response associated with at least one of the first frequency range and the second frequency range.

According to one or more embodiments of this aspect, the first frequency range is a subwoofer frequency range, and the second frequency range is a midrange frequency range.

According to one or more embodiments of this aspect, the calibration device is further configured to generate a first reference audio signal associated with the first frequency range for playback on a first loudspeaker associated with the first audio driver and a second reference audio signal associated with the second frequency range for playback on a second loudspeaker associated with the second audio driver. The receiver is further configured to receive the first reference audio signal and the second reference audio signal, and cause playback of the first reference audio signal on the first loudspeaker and the second reference audio signal on the second loudspeaker. The calibration device is further configured to measure the playback of the first loudspeaker to determine the first impulse response, and measure the playback of the second loudspeaker to determine the second impulse response.

According to one or more embodiments of this aspect, the calibration device is further configured to determine the first start time of the first impulse response signal by determining a baseline noise level associated with the first frequency range, and detecting, at the first start time, a rise in the first impulse response signal over the baseline noise level, the rise being at least as large as a predetermined threshold value.

According to one or more embodiments of this aspect, the calibration device is configured to determine the first start time of the first impulse response signal by determining a baseline noise level associated with the first frequency range, and detecting, at the first start time, a rise in the first impulse response signal over the baseline noise level, the rise being at least as large as a predetermined threshold value.

According to another aspect of the present disclosure, a calibration device for phase alignment of audio signals using a first impulse response signal associated with a first frequency range and a second impulse response signal associated with a second frequency range is provided. The calibration device is configured to determine a first start time for the first impulse response and a second start time for the second impulse response, determine a delay based at least in part on a difference between the second start time and the first start time, and transmit a configuration to a receiver indicating the delay and enabling the receiver to adjust at least one audio signal phase for a first audio driver operating in the first frequency range with respect to a second audio driver operating in the second frequency range, the adjusting of the at least one audio signal phase being based at least in part on the delay.

According to one or more embodiments of this aspect, the calibration device is further configured to equalize a magnitude of the first impulse response and a magnitude of the second impulse response prior to determining the delay.

According to one or more embodiments of this aspect, the delay is further determined based on a difference between the first start time and a reference start time of a model impulse response associated with at least one of the first frequency range and the second frequency range.

According to one or more embodiments of this aspect, the first frequency range is a subwoofer frequency range, and the second frequency range is a midrange frequency range.

According to one or more embodiments of this aspect, the calibration device is further configured to generate a first reference audio signal associated with the first frequency range for playback a first loudspeaker associated with the first audio driver and a second reference audio signal associated with the second frequency range for playback on a second loudspeaker associated with the second audio driver, transmit the first reference audio signal and the second reference audio signal to the receiver enabling the receiver to cause playback of the first reference audio signal on the first loudspeaker and the second reference audio signal on the second loudspeaker, measure the playback of the first loudspeaker to determine the first impulse response, and measure the playback of the second loudspeaker to determine the second impulse response.

According to one or more embodiments of this aspect, the calibration device is configured to determine the first start time of the first impulse response signal by determining a baseline noise level associated with the first frequency range, and detecting, at the first start time, a rise in the first impulse response signal over the baseline noise level, the rise being at least as large as a predetermined threshold value.

BRIEF DESCRIPTION OF THE DRAWINGS

A more complete understanding of embodiments described herein, and the attendant advantages and features thereof, will be more readily understood by reference to the following detailed description when considered in conjunction with the accompanying drawings wherein.

DETAILED DESCRIPTION

Figure 1:
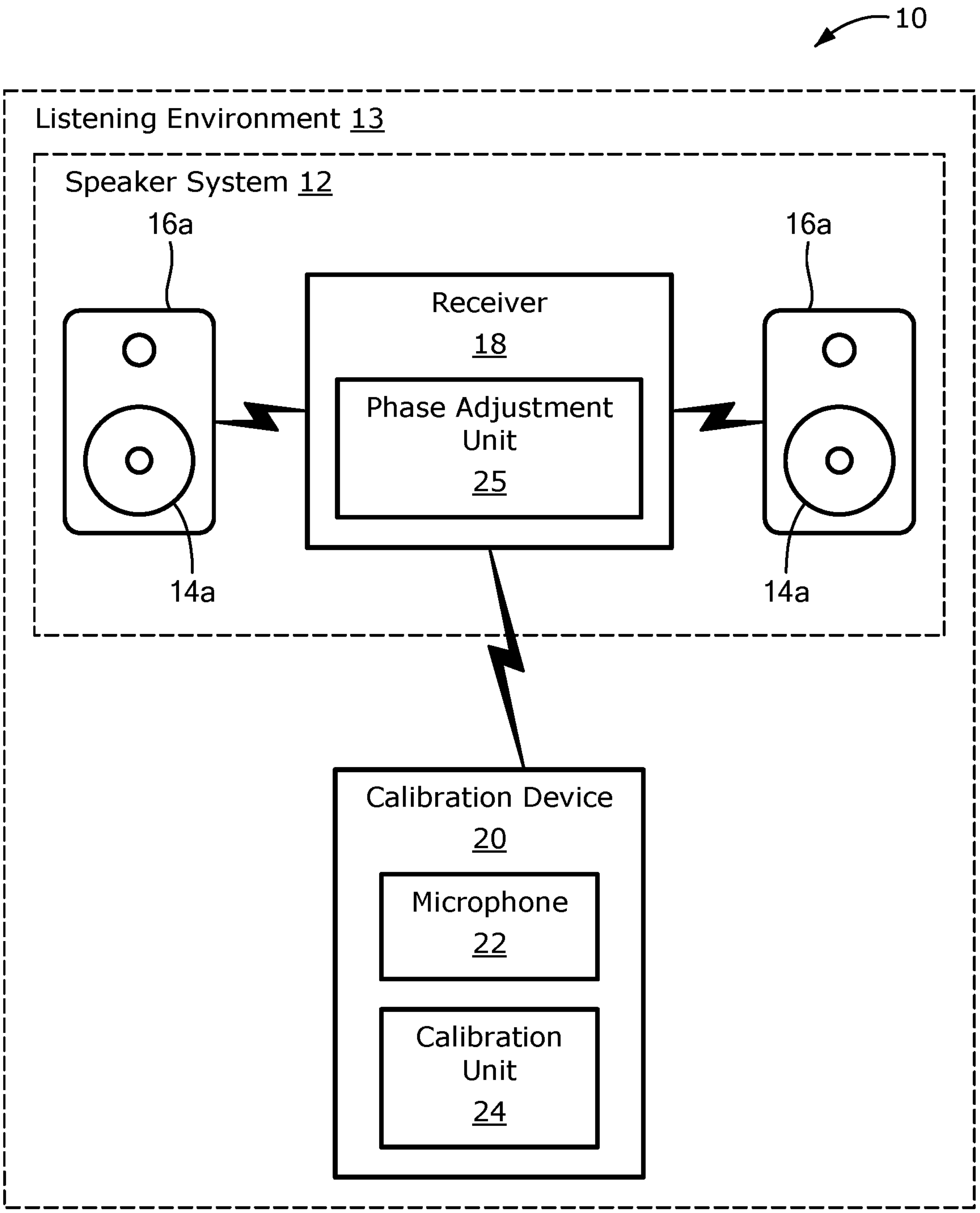
FIG. 1 is a diagram of an example system comprising a calibration device and a receiver according to principles disclosed herein.

Before describing in detail exemplary embodiments, it is noted that the embodiments reside primarily in combinations of apparatus components and processing steps related to phase alignment of loudspeakers in audio systems. Accordingly, the system and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Referring again to the drawing figures in which like reference designators refer to like elements there is shown in FIG. 1 a system designated generally as "10." System 10 may include a speaker system 12 located in a listening environment 13 (e.g., a professional theater, home theater, vehicle cabin, boat cabin, etc.), which includes a plurality of speakers 14*a*-14*n* (collectively, speakers 14) and a plurality of corresponding audio drivers 16*a*-16*n* (collectively, audio drivers 16). In some embodiments, the speakers 14 and audio drivers 16 are the same device, while in other embodiments, they may be separate devices, different modules within the same device, etc. Thus, as used herein, the term "speaker", "loudspeaker", and/or "audio driver" may be used interchangeably to refer to a speaker 14 and/or audio driver 16.

Speaker 14*a* may be a subwoofer associated with a first frequency spectrum, while speaker 14*b* may be a midbass associated with a second frequency spectrum. The first and second frequency spectra may be partially overlapping. Although only two speakers are shown in the example of FIG. 1, other speakers 14 (e.g., tweeters, midrange, etc.) may be used in speaker system 12, such that the phases/delays of each of the speakers 14 may be calibrated to match one another and/or a reference speaker 14.

Speaker system 12 may further include a receiver 18 which is configured to receive and/or generate audio signals from one or more sources (e.g., digital media storage, internet-based streaming audio/video service, another device such as a smartphone, a calibration device, etc.). Receiver 18 may transmit and/or receive analog and/or digital audio signals (and/or other signaling, such as data packets, audio channels, control signals, etc.) to/from speakers 14 and/or audio drivers 16, or any other entity of system 10, via a wired and/or wireless (e.g., Bluetooth, Wi-Fi, etc.) channel and/or connection. Each speaker 14 (and/or audio driver 16) may receive the audio signals from receiver 18 at slightly different timings, e.g., due to differences in the wired and/or wireless connections (e.g., cable length, channel interference, random noise, hardware capabilities, etc.). Receiver 18 may be configured to equalize audio signals and/or adjust the phases/timings of audio signals, e.g., according to a configuration received from another entity of system 10. Of note, although the invention is described with reference to a "receiver", this is done purely for the sake of convenience and to aid understanding. Implementations are not limited to receiver in the audio/visual sense of a device with an integrated preamplifier, source selection components and amplifiers. Rather, "receiver" as used herein refers to the component that is receiving or generating audio signals intended for reproduction. Non-limiting examples include audio/visual receivers in the tradition sense, preamplifiers, digital signal processors, integrated amplifiers, and other computing devices that process signals for audio reproduction.

System 10 further includes a calibration device 20, which may be configured to transmit and/or receive signaling (e.g., audio signals, data packets, control signals, etc.) to/from receiver 18, e.g., via a wired and/or wireless connection (e.g., Bluetooth, Wi-Fi, etc.). Calibration device 20 may be a computing device configured for processing audio signaling and determining phase delay adjustments in a speaker system 12, which may be specifically calibrated for listening environment 13 or a particular location (e.g., the driver's seat in a car) in listening environment 13. For example, calibration device 20 may be a portable computer, a stationary computer (e.g., desktop), a smartphone, a remote server, a cloud-based server, etc. In some embodiments, calibration device 20 may be integrated with receiver 18, while in other embodiments, calibration device 20 may be a separate device.

Calibration device 20 includes one or more microphones 22 for detecting audio output from speakers 14 and/or audio drivers 16. Calibration device 20 includes a calibration unit 24 configured for detection of phase delay of speakers 14 and/or for performing phase/timing calibration and alignment procedures, as disclosed herein. For example, calibration device 20 may be configured to transmit (or indirectly cause transmission of, e.g., via an intermedia device and/or network) a configuration and/or control signaling to the receiver 18 for the receiver 18 to apply to one or more audio signals/channels for speakers 14 and/or audio drivers 16. For example, following a calibration procedure, as disclosed herein, calibration device 20 may transmit to receiver 18 configuration information which indicates one or more of a calibration metric, delay metric, phase/timing metric, etc., for receiver 18 to apply to one or more audio signals/channels, e.g., for adjusting the phase of one or more audio signals/channels to align the timing/phase of a plurality of speakers 14.

Example implementations, in accordance with one or more embodiments, of calibration device 20 discussed in the preceding paragraphs will now be described with reference to FIG. 2.

The system 10 includes a calibration device 20 that includes hardware 26 enabling the calibration device 20 to communicate with one or more entities in system 10 and to perform one or more functions described herein. The hardware 26 may include a communication interface 28 for setting up and maintaining at least a wired and/or wireless connection to one or more entities in system 10 such as receiver 18, speakers 14, audio drivers 16, other calibration devices 20, etc.

In the embodiment shown, the hardware 26 of the calibration device 20 further includes processing circuitry 30. The processing circuitry 30 may include a processor 32 and a memory 34. In particular, in addition to or instead of a processor, such as a central processing unit, and memory, the processing circuitry 30 may comprise integrated circuitry for processing and/or control, e.g., one or more processors and/or processor cores and/or field programmable gate arrays (FPGAs) and/or application specific integrated circuits (ASICs) adapted to execute instructions. The processor 32 may be configured to access (e.g., write to and/or read from) the memory 34, which may comprise any kind of volatile and/or nonvolatile memory, e.g., cache and/or buffer memory and/or random access memory (RAM) and/or read-only memory (ROM) and/or optical memory and/or erasable programmable read-only memory (EPROM).

Thus, the calibration device 20 further has software 36 stored internally in, for example, memory 34, or stored in external memory (e.g., database, storage array, network storage device, etc.) accessible by the calibration device 20 via an external connection. The software 36 may be executable by the processing circuitry 30. The processing circuitry 30 may be configured to control any of the methods and/or processes described herein and/or to cause such methods, and/or processes to be performed, e.g., by calibration device 20. Processor 32 corresponds to one or more processors 32 for performing calibration device 20 functions described herein. The memory 34 is configured to store data, programmatic software code and/or other information described herein. In some embodiments, the software 36 may include instructions that, when executed by the processor 32 and/or processing circuitry 30, causes the processor 32 and/or processing circuitry 30 to perform the processes described herein with respect to calibration device 20. For example, processing circuitry 30 of the calibration device 20 may include calibration unit 24 which is configured to perform one or more calibration device 20 functions described herein such as with respect to phase delay detection and alignment procedures, as disclosed herein.

Example implementations, in accordance with one or more embodiments, of receiver 18 discussed in the preceding paragraphs will now be described with reference to FIG. 3.

The system 10 includes a receiver 18 that includes hardware 38 enabling the receiver 18 to communicate with one or more entities in system 10 and to perform one or more functions described herein. The hardware 38 may include a communication interface 40 for setting up and maintaining at least a wired and/or wireless connection to one or more entities in system 10 such as calibration device 20, speakers 14, audio drivers 16, other receivers 18, etc.

In the embodiment shown, the hardware 38 of the receiver 18 further includes processing circuitry 42. The processing circuitry 42 may include a processor 44 and a memory 46. In particular, in addition to or instead of a processor, such as a central processing unit, and memory, the processing circuitry 42 may comprise integrated circuitry for processing and/or control, e.g., one or more processors and/or processor cores and/or field programmable gate arrays (FPGAs) and/or application specific integrated circuits (ASICs) adapted to execute instructions. The processor 44 may be configured to access (e.g., write to and/or read from) the memory 46, which may comprise any kind of volatile and/or nonvolatile memory, e.g., cache and/or buffer memory and/or random access memory (RAM) and/or read-only memory (ROM) and/or optical memory and/or erasable programmable read-only memory (EPROM).

Thus, the receiver 18 further has software 48 stored internally in, for example, memory 46, or stored in external memory (e.g., database, storage array, network storage device, etc.) accessible by the receiver 18 via an external connection. The software 48 may be executable by the processing circuitry 42. The processing circuitry 42 may be configured to control any of the methods and/or processes described herein and/or to cause such methods, and/or processes to be performed, e.g., by receiver 18. Processor 44 corresponds to one or more processors 32 for performing receiver 18 functions described herein. The memory 46 is configured to store data, programmatic software code and/or other information described herein. In some embodiments, the software 48 may include instructions that, when executed by the processor 44 and/or processing circuitry 42, causes the processor 44 and/or processing circuitry 42 to perform the processes described herein with respect to receiver 18. For example, processing circuitry 42 of the receiver 18 may include phase adjustment unit 25 which is configured to perform one or more receiver 18 functions described herein such as with respect to phase/timing alignment of audio signals for speakers 14 and/or audio drivers 16 (e.g., based on configuration information received from calibration device 20), as disclosed herein.

Figure 2:
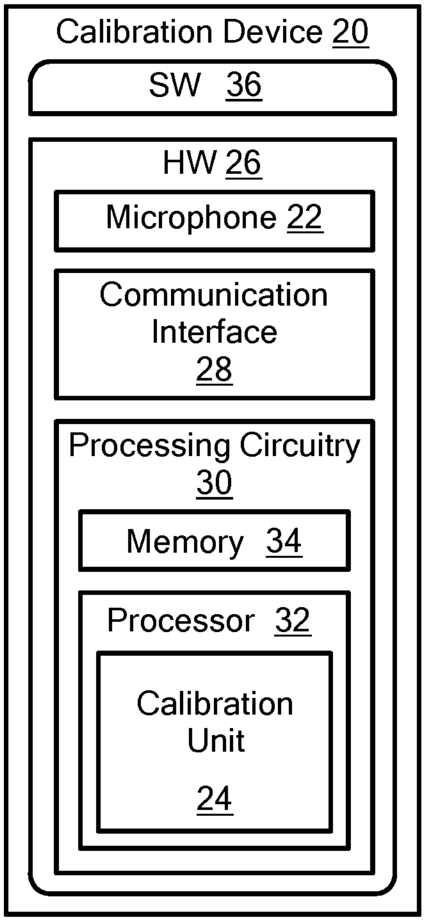
FIG. 2 is a diagram of a calibration device in the system according to some embodiments of the present disclosure.
Figure 3:
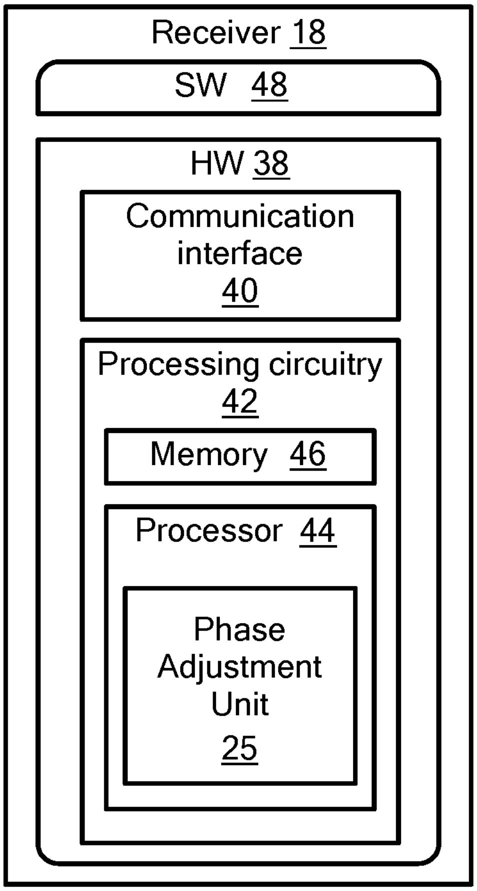
FIG. 3 is a diagram of a receiver in the system according to some embodiments of the present disclosure.

Although FIGS. 1, 2, and 3 show calibration unit 24 and phase adjustment unit 25 as being within a respective processor, these units may be implemented such that a portion of a unit is stored in a corresponding memory within the processing circuitry. In other words, the units may be implemented in hardware or in a combination of hardware and software within the processing circuitry.

Embodiments of the present disclosure may provide methods, systems, and/or apparatuses for measuring phase delay of audio signals based at least in part on detecting the beginning/start of the measured impulse responses, e.g., when the signal emerges from the noise floor, which may yield an improved transient behavior (e.g., a more idealized impulse response shape), for example, as compared to conventional systems (e.g., systems which use peak alignment methods which determine the delay based on the magnitude peak of the impulse response) for impulse response phase delay measurement. Techniques based on detecting the beginning/start of the measured impulse responses may be referred to herein as "true delay" techniques. Some embodiments of the present disclosure using such true delay techniques may advantageously be less computationally expensive as compared to existing methods, e.g., existing methods where multiple computationally expensive fast Fourier transforms (FFTs) are required.

Figure 4:
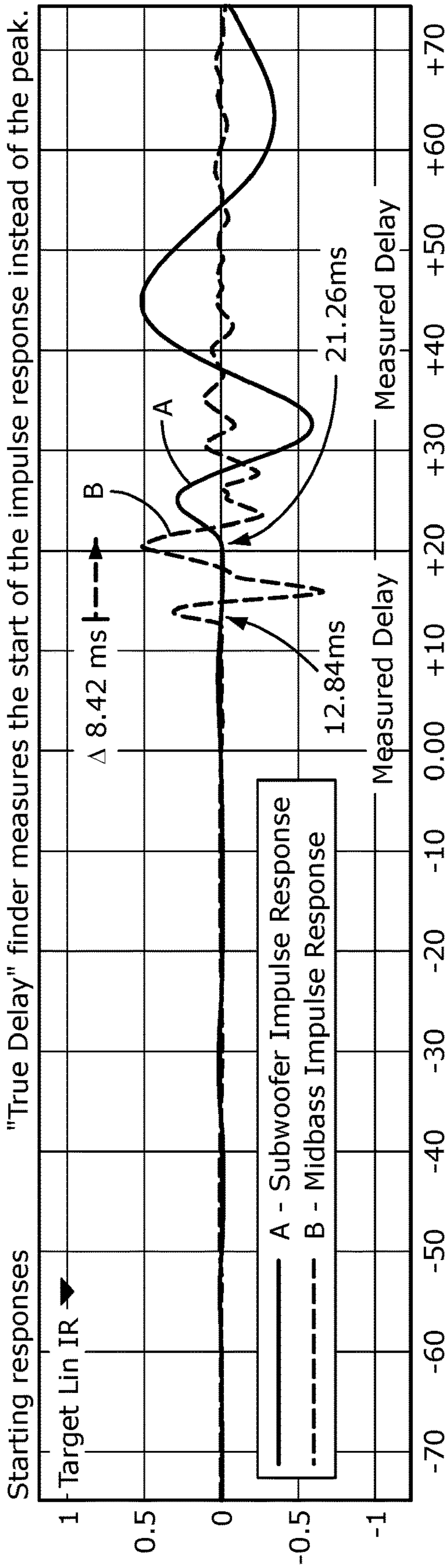
FIG. 4 is a graph illustrating example impulse responses according to embodiments of the present disclosure, i.e., a true delay procedure.
Figure 5:
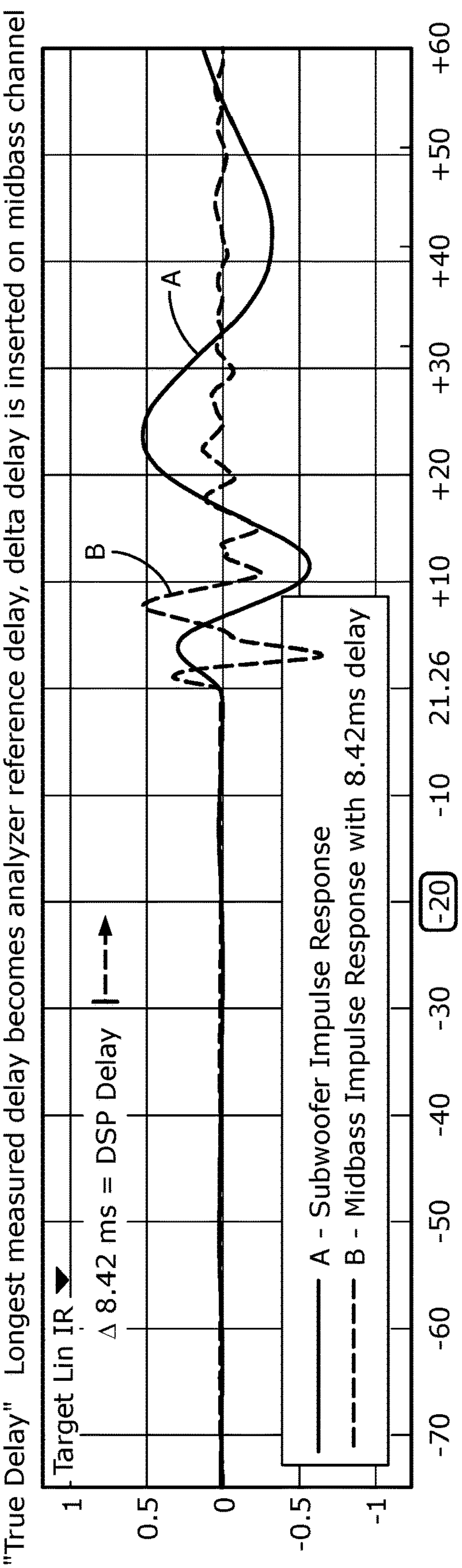
FIG. 5 is a graph illustrating example delay measurements according to embodiments of the present disclosure, i.e., a true delay procedure.
Figure 6:
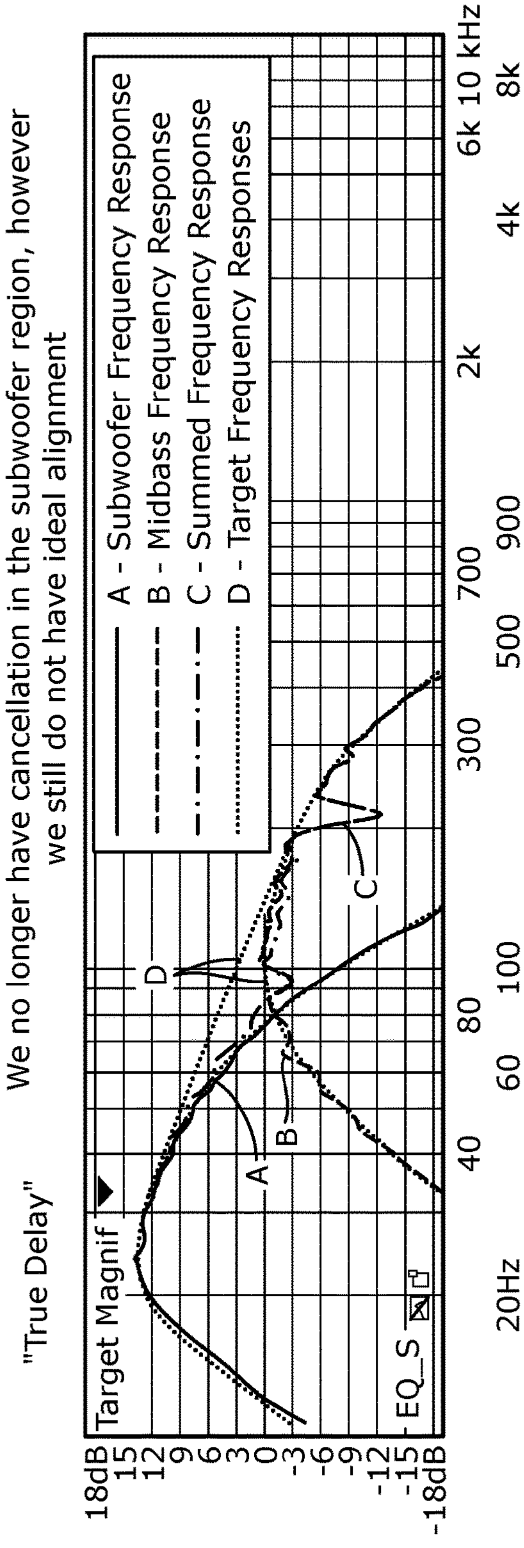
FIG. 6 is a graph illustrating magnitude (frequency) responses according to embodiments of the present disclosure, i.e., a true delay procedure.

Initially it is noted that the discrete values provided herein are solely to aid understanding of the various embodiments. FIG. 4, FIG. 5, and FIG. 6 illustrate an example phase alignment procedure according to embodiments of the present disclosure. In FIG. 4, example subwoofer impulse response and midbass impulse response are measured by calibration device 20 (e.g., using microphone 22), and the start times of the impulse responses are determined (e.g., by calibration unit 24). This can be done, for example, by detecting the start times of the impulse responses. This may be in place of, or in addition to, conventional delay techniques, e.g., which measure the peak times of the impulse response signals. In the example of FIG. 4, the calibration device determines a 12.84 ms measured delay for the midbass impulse response and a 21.26 ms measured delay for the subwoofer impulse response. The longest measured delay time (21.26 ms in this example) is used by calibration device 20 as the reference delay time, and the delta between the longest measured delay time and the other measured delay time(s) (in this example, the 12.84 ms delay time of the midbass channel) is determined, e.g., 8.42 ms, which may be considered the DSP delay. The calibration device 20 may instruct receiver 18 to insert the delta (e.g., 8.42 ms in this example) on the midbass channel (i.e., apply a timing/phase delay to the midbass channel(s) relative to the subwoofer channel(s)). The result of the phase adjustment using the calculated delta is illustrated in FIG. 5, which is a phase diagram which illustrates the result of applying the 8.42 ms calculated delta to the midbass impulse response of FIG. 4. FIG. 6 illustrates the magnitude (frequency) response corresponding to the phase adjustment illustrated in FIG. 5. In FIG. 6, the subwoofer frequency response, midbass frequency response, summed frequency response, and target frequency response are shown. As a result of the phase adjustment procedure described above, according to embodiments of the present disclosure, there is reduced cancellation in the subwoofer region, which represents an improvement over conventional techniques (e.g., peak finder techniques).

As FIG. 6 shows, however, there may still be non-ideal alignment throughout the cross-over region in some examples. Additional processing according to some embodiments disclosed herein may achieve further improvement in phase alignment.

Figure 7:
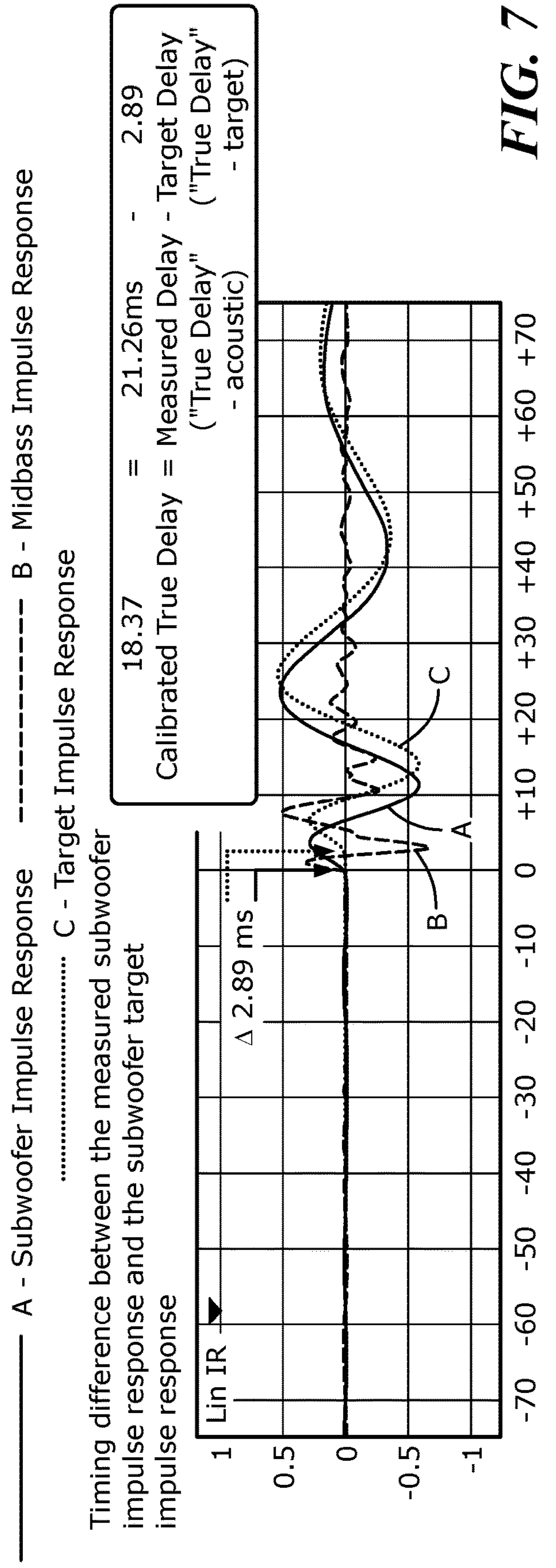
FIG. 7 is a graph illustrating example impulse responses and delay measurements according to embodiments of the present disclosure, i.e., a calibrated true delay procedure.
Figure 8:
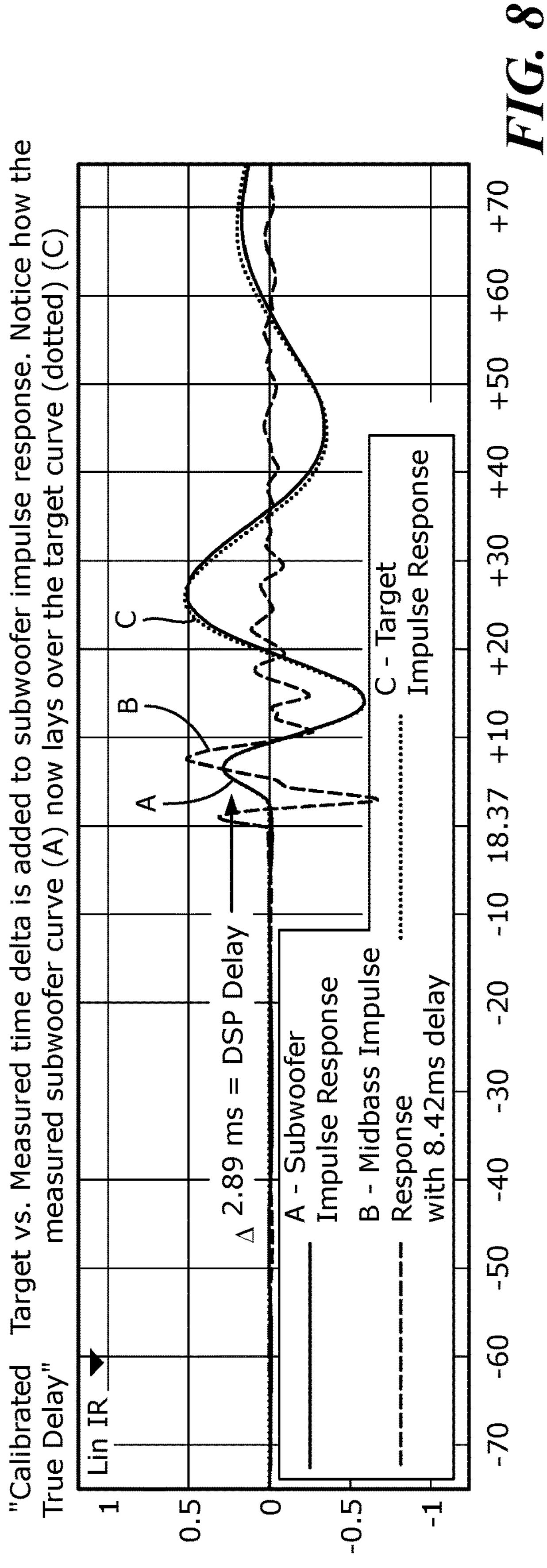
FIG. 8 is a graph illustrating example impulse responses and delay measurements according to embodiments of the present disclosure, i.e., a calibrated true delay procedure.
Figure 9:
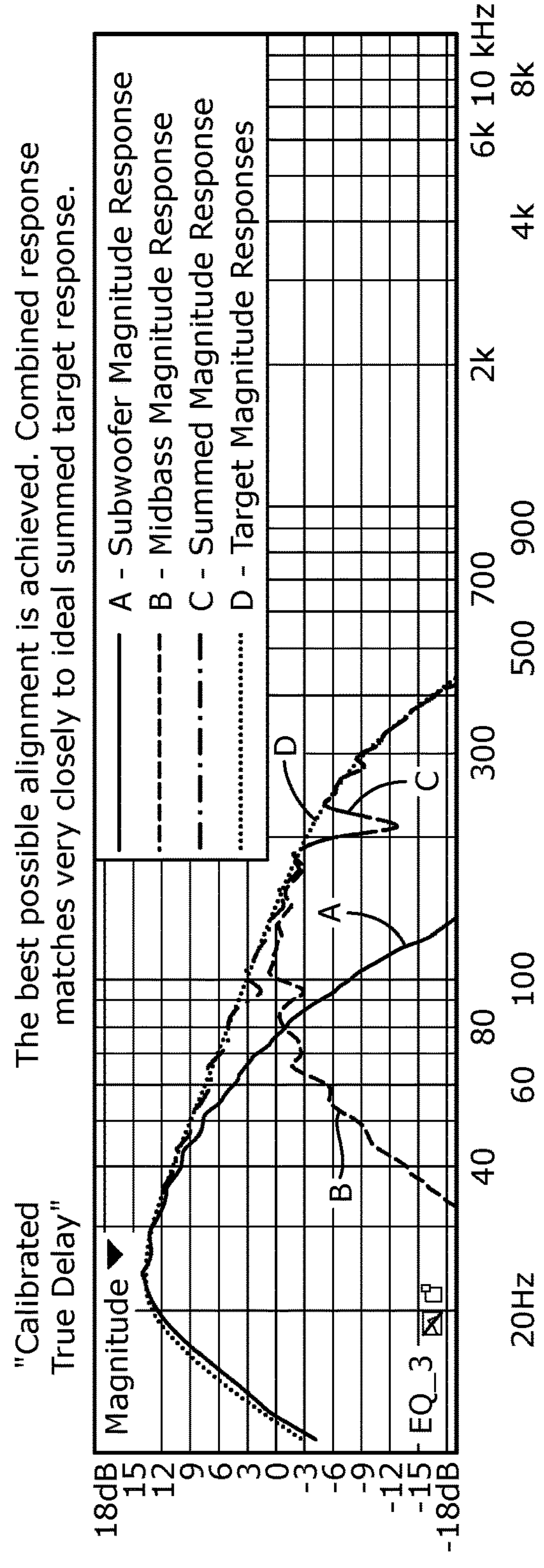
FIG. 9 is a graph illustrating example magnitude responses according to embodiments of the present disclosure, i.e., a calibrated true delay procedure.

FIG. 7, FIG. 8, and FIG. 9 illustrate another example phase alignment procedure according to some embodiments of the present disclosure, in which a phase response of a model/target impulse response is used by calibration device 20 as a calibration factor, which may be referred to herein as "calibrated true delay" embodiments or techniques. FIG. 7 illustrates an example subwoofer impulse response, midrange impulse response, and target (model) impulse response. The timing difference between the measured subwoofer impulse response and the subwoofer model/target impulse response is determined by calibration device 20 (e.g., via calibration unit 24). The model/target impulse response may be preconfigured in calibration device 20, and/or may be determined, e.g., based on the impulse response signal(s) which calibration device 20 provides to receiver 18. In the example of FIG. 7, the (measured) subwoofer impulse response delay time is measured as 21.26 ms, e.g., according to the techniques described above. The target impulse response delay time (e.g., a time corresponding to a point on the slope of the target impulse response which is the same as the slope of the measured impulse response at the measured impulse response delay time, as discussed below), is determined by calibration device 20 (e.g., in this example, the target impulse response delay time is determined to be 2.89 ms). The calibrated true delay time is determined (e.g., by calibration device 20 and/or receiver 18), based on the difference between the target impulse response delay time and the measured impulse response delay time (which in this example is 18.37 ms). This difference (e.g., 18.37 ms) is then used (e.g., by receiver 18) for adjusting the phase of the subwoofer audio signal and/or another audio signal/channel, as depicted in the example of FIG. 8. In FIG. 8, the delta (i.e., difference) between the target impulse response delay time and the measured impulse response delay time is added (e.g., by calibration device 20 and/or receiver 18) to the subwoofer audio signal. The measured subwoofer curve, after the phase has been adjusted according to these above-described techniques, substantially overlays the target curve. FIG. 9 depicts the improved alignment achieved according to embodiments of the present disclosure. The combined response matches closely to the ideal (model) summed target response.

The techniques as described herein (which may be referred to as "true delay" techniques and/or "calibrated true delay" techniques) may be superior to conventional techniques (e.g., peak finder techniques) in several ways. For example, embodiments of the present disclosure may determine a phase delay which may be robust even in the presence of acoustic reflections, and which may achieve more accurate delay time determinations than conventional techniques. For example, the peak of a subwoofer impulse response is often 10+ ms later than the actual initial arrival, and thus may be inaccurate as compared to measuring the start times of the impulse responses. Furthermore, as disclosed herein, using calibration factors (e.g., according to a calibrated true delay technique) for phase adjustment may further improve the accuracy of the phase adjustment by finding a point at the beginning of the target impulse response which is at least slightly up (or down) the slope of the measured impulse response signal. This may enable the calibration device 20 to steer clear of (i.e., minimize the effects of, filter out, etc.) the noise floor in its determinations/calculations, which may aid in minimizing susceptibility to inaccurate and inconsistent results. By configuring the calibration device 20 to apply the true delay algorithm to steer clear of the noise floor, calibration device 20 may be able to improve consistency in accurately pinpointing ("locking onto") a first point along the beginning slope of the impulse response(s) for use in determining the phase delay. The calibration device 20 may then find a second point on the target/model impulse response, which may be the "same point" as the first point, e.g., with respect to the slopes of the acoustic impulse response and the model impulse response, and may determine the difference between the first point and the second point, where the difference is then used as a basis for determining the desired delay time and/or phase adjustment parameters) for the receiver 18 to apply.

In some embodiments, the calibration device 20 may determine at least one characteristic (e.g., the derivative, slope, etc.) of the measured impulse response(s) at the first point, and may determine/locate/identify the second point of the model impulse response based at least in part on the at least one characteristic of the first point. For example, the second point may be a point on the model impulse response which has similar or identical characteristic(s) (e.g., the same or similar slope(s) or derivative value(s)) compared to the characteristics of the measured impulse response at the first point.

In some embodiments, an example impulse response of the subwoofer when delay time is measured (by calibration device 20) using the true delay technique may be compared to the ideal (target/model) subwoofer impulse response. In some embodiments, an example impulse response of the subwoofer when the delay time is measured (by calibration device 20) using the calibrated true delay technique may be compared to the ideal (target/model) subwoofer impulse response. Such comparisons may enable determining the accuracy, improvement, etc., of the true delay technique and calibrated true delay technique.

In some embodiments, the subwoofer phase response and midbass phase response may be aligned using the true delay technique. In some embodiments, the subwoofer phase response and midbass phase response may be aligned using the calibrated true delay technique.

Figure 10:
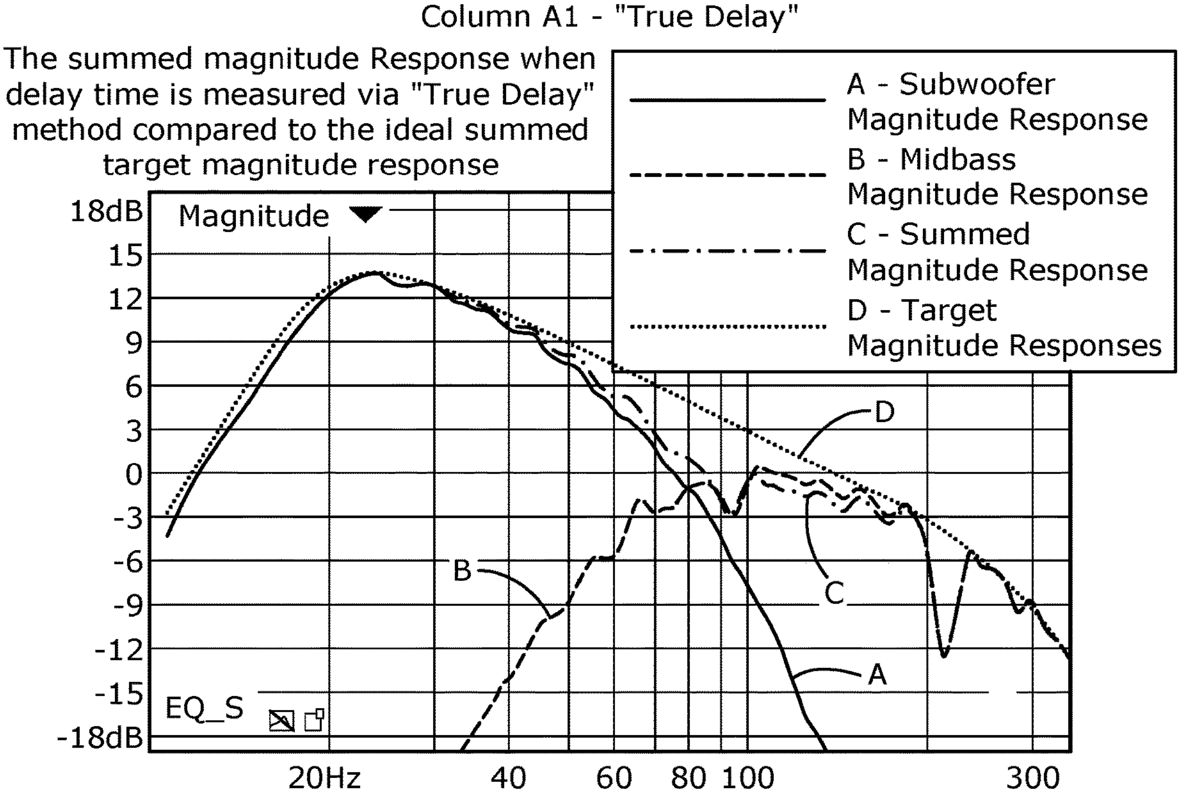
FIG. 10 is a graph illustrating magnitude (frequency) responses according to embodiments of the present disclosure, i.e., a true delay procedure.
Figure 11:
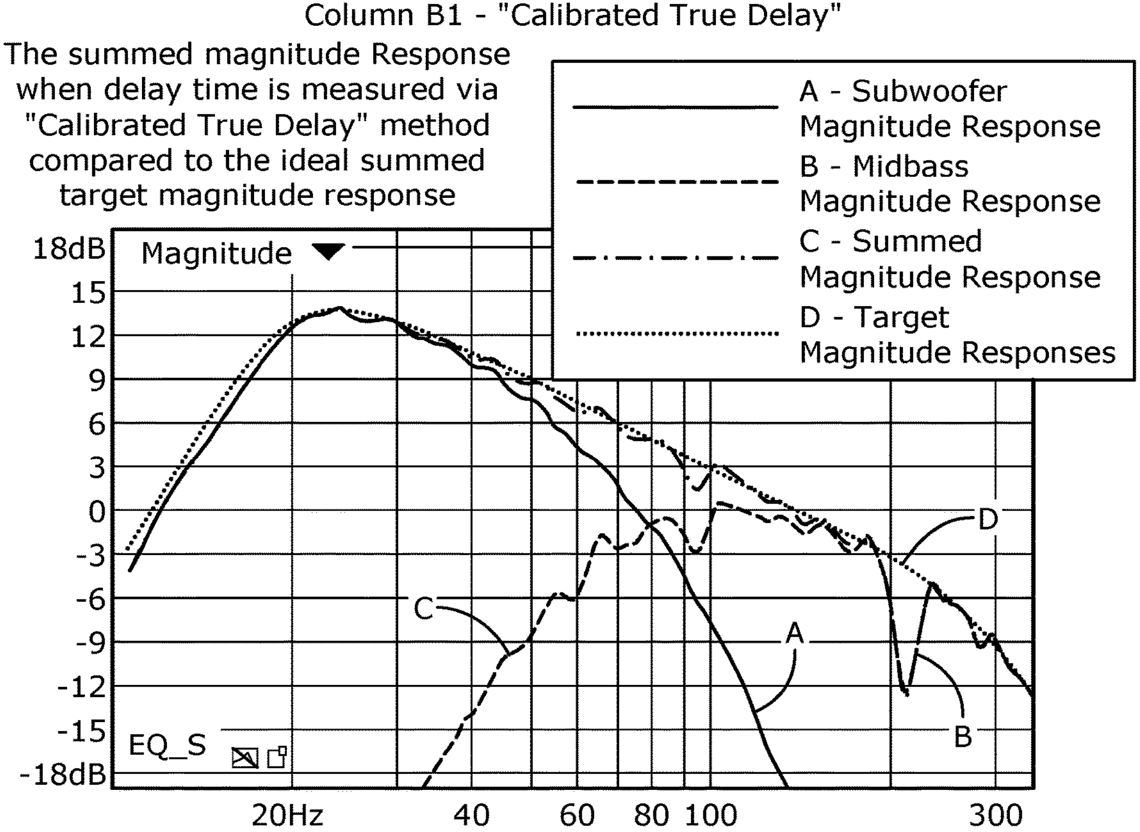
FIG. 11 is a graph illustrating magnitude (frequency) responses according to embodiments of the present disclosure, i.e., a calibrated true delay procedure.

FIG. 10 illustrates the subwoofer magnitude response, midbass magnitude response, summed magnitude response, and target magnitude response of example impulse response signals, where the delay time is measured by calibration device 20 using the true delay technique. FIG. 11 illustrates the subwoofer magnitude response, midbass magnitude response, summed magnitude response, and target magnitude response of example impulse response signals, where the delay time is measured by calibration device 20 using the calibrated true delay technique. These figures illustrate and compare the improvement in accuracy, calibration, etc. provided by the true delay technique and calibrated true delay technique, as described herein.

In some embodiments, e.g., using a calibrated true delay technique, the calibration device 20 considers the measured ("real") impulse responses, and the target/model impulse responses. The difference in the two delay times may be the actual delay time of the subwoofer. Lower frequency range speakers 14, such as subwoofers, may in particular benefit from the techniques described herein, but it is to be understood that a variety of speaker types for different frequency spectra may be measured and calibrated/adjusted in this manner.

The calibrated true delay may result in more accurate phase adjustments, in particular when measuring lower frequency range speaker (e.g., subwoofer) delay times. In some embodiments, the lower in frequency the bandwidth (frequency spectrum associated with the speaker), the greater the accuracy improvement when using the calibrated true delay versus other techniques. Determining the start of the impulse responses using the true delay technique may work better for higher frequency transducer/speakers 14/audio drivers 16/etc., but for lower frequency speakers transducers/speakers 14/audio drivers 16/etc., the comparative model (e.g., calibrated true delay) may be utilized by calibration device 20 for improved accuracy, where the comparative model describes the "actual" timing position of the subwoofer impulse response at "0 ms", for example. Using a comparative model may also enable the determination by calibration device 20 to steer clear of the noise floor, further improving accuracy/consistency/etc.

In some embodiments, the midbass speaker 14*b* impulse response and the subwoofer speaker 14*a* impulse response may be aligned by calibration device 20 via the true delay technique, and the summed impulse responses may be compared to the ideal summed target impulse response. In some embodiments, the midbass speaker 14*b* impulse response and the subwoofer speaker 14*a* impulse response may be aligned by calibration device 20 via the calibrated true delay technique, and the summed impulse responses may be compared to the ideal summed target impulse response.

In some embodiments, the phase responses of the midbass speaker 14*b* impulse response and the subwoofer speaker 14*a* impulse response may be aligned by calibration device 20 using the true delay technique. In some embodiments, the phase responses of the midbass speaker 14*b* impulse response and the subwoofer speaker 14*a* impulse response may be aligned by calibration device 20 using the calibrated true delay technique.

In some embodiments, the magnitude response of the subwoofer speaker 14*a* impulse response, the midbass speaker 14*b* impulse response, the summed measured impulse responses, and the target/model impulse response may be determined when the calibration device 20 applies the true delay technique. In some embodiments, the magnitude response of the subwoofer speaker 14*a* impulse response, the midbass speaker 14*b* impulse response, the summed measured impulse responses, and the target/model impulse response may be determined when the calibration device 20 applies the calibrated true delay technique.

Comparing the above examples, the calibrated true delay technique may typically result in a more accurate measured impulse response, a more minimized difference in phase angle between midbass speaker 14*b* impulse response and subwoofer speaker 14*a* impulse response, and a more optimal summation of individual responses, as compared with the true delay technique. In some embodiments, a calibrated true technique may include the calibration device 20 running the target/model impulse response through the true delay algorithm to determine a second delay value, and determining the delay time, and subtracting that from the first true delay value of the measured impulse response(s) to obtain the phase difference to be applied (the "actual delay" of the speaker 14).

In some embodiments, the summed impulse response may be compared to the target impulse response when aligned by calibration device 20 using a true delay technique according to some embodiments of the present disclosure. In some embodiments, the phase responses of the midbass speaker 14*b* impulse response and the subwoofer speaker 14*a* impulse response may be compared when aligned by calibration device 20 using the true delay technique.

In some embodiments, the summed impulse response may be compared to the target impulse response when aligned by calibration device 20 using a calibrated true delay technique according to some embodiments of the present disclosure. In some embodiments, the phase responses of the midbass speaker 14*b* impulse response and the subwoofer speaker 14*a* impulse response may be compared when aligned by calibration device 20 using the calibrated true delay technique.

In some embodiments, the acoustic amplitude may be determined as a function of time. In some embodiments, the phase may be determined as a function of frequency.

Figure 12:
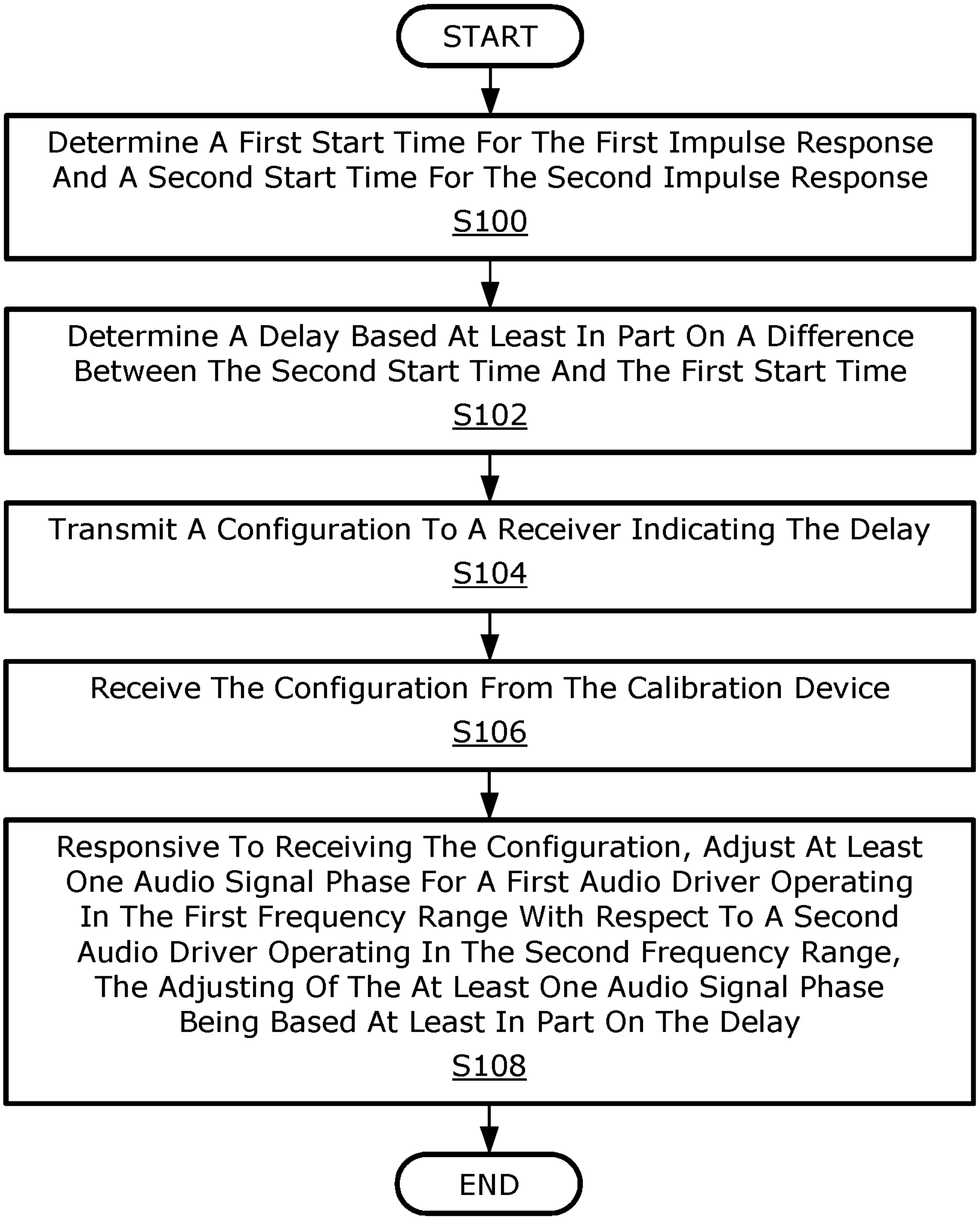
FIG. 12 is a flowchart of an example process in a system according to some embodiments of the present disclosure.

FIG. 12 is a flowchart of an example process in a system 10 including a receiver 18 and a calibration device 20 according to one or more embodiments of the present invention. One or more blocks described herein may be performed by one or more elements of calibration device 20 such as by one or more of microphone 22, communication interface 28, processing circuitry 30 (including the calibration unit 24), processor 32, etc. One or more blocks described herein may be performed by one or more elements of receiver 18 such as by one or more of communication interface 40, processing circuitry 42 (including the phase adjustment unit 25), processor 44, etc. Calibration device 20 configured to determine (Block S100) a first start time for the first impulse response and a second start time for the second impulse response. Calibration device 20 configured to determine (Block S102) a delay based at least in part on a difference between the second start time and the first start time. Calibration device 20 is configured to transmit (Block S104) of a configuration to a receiver indicating the delay. In some embodiments, calibration device 20 and receiver 18 may be the same device, in which case, the transmission (Block S104) may not occur, and/or may occur within the device (e.g., between different modules, processors, etc.). In some embodiments, the configuration may indicate and/or include the delay (and/or one or more values/parameters/metrics which are determined/detected by calibration device 20).

Receiver 18 is configured to receive (Block S106) the configuration from the calibration device. Receiver 18 is configured to, responsive to receiving the configuration, adjust (Block S108) at least one audio signal phase for a first audio driver operating in the first frequency range with respect to a second audio driver operating in the second frequency range, where the adjusting of the at least one audio signal phase is based at least in part on the delay (and/or other metrics/values indicated by the configuration).

In some embodiments, the calibration device 20 (and/or the receiver 18) is further configured to equalize the magnitudes of the first impulse response and the second impulse response prior to determining the delay. In some embodiments, the calibration device 20 (and/or the receiver 18) is further configured to determine the delay based on a difference between the first start time (i.e., of the measured "real" acoustic response) and a reference start time of a model impulse response (i.e., a mathematically generated, pure signal w/o noise, where the model impulse response is run through the a delay finder procedure at the same settings/parameters as the measured impulse response(s) to determine the reference start time) associated with at least one of the first frequency range and the second frequency range. The model impulse response may be generated by calibration device 20 and/or receiver 18, and/or may be preconfigured. In some embodiments, the first frequency range is a subwoofer frequency range, and the second frequency range is a midrange frequency range.

In some embodiments, receiver 18 is further configured to generate (and/or receive, e.g., from another device, such as calibration device 20) a first reference audio signal associated with the first frequency range for playback on the first loudspeaker 14*a* and a second reference audio signal associated with the second frequency range for playback on the second loudspeaker 14*b*. The calibration device 20 is further configured to measure the playback of the first loudspeaker 14*a* to determine the first impulse response, and measure the playback of the second loudspeaker 14*b* to determine the second impulse response.

In some embodiments, the determining of the first start time of the first impulse response signal includes determining a baseline noise level (e.g., one or more of a baseline ambient noise level, an acoustic noise floor, Gaussian white noise, etc.) associated with the first frequency range, and detecting, at the first start time, a rise in the first impulse response signal over the baseline signal level, the rise being at least as large as a predetermined (and/or preconfigured) threshold value.

In some embodiments, the calibration device 20 is further configured to generate a first reference audio signal associated with the first frequency range for playback on a first loudspeaker 14 associated with the first audio driver 16 and a second reference audio signal associated with the second frequency range for playback on a second loudspeaker 14 associated with the second audio driver 16. The receiver 18 is further configured to receive the first reference audio signal and the second reference audio signal, and cause playback of the first reference audio signal on the first loudspeaker 14 and the second reference audio signal on the second loudspeaker 14. The calibration device 20 is further configured to measure the playback of the first loudspeaker 14 to determine the first impulse response, and measure the playback of the second loudspeaker 14 to determine the second impulse response.

In some embodiments, the calibration device 20 is further configured to determine the first start time of the first impulse response signal by determining a baseline noise level associated with the first frequency range, and detecting, at the first start time, a rise in the first impulse response signal over the baseline noise level, the rise being at least as large as a predetermined threshold value.

Figure 13:
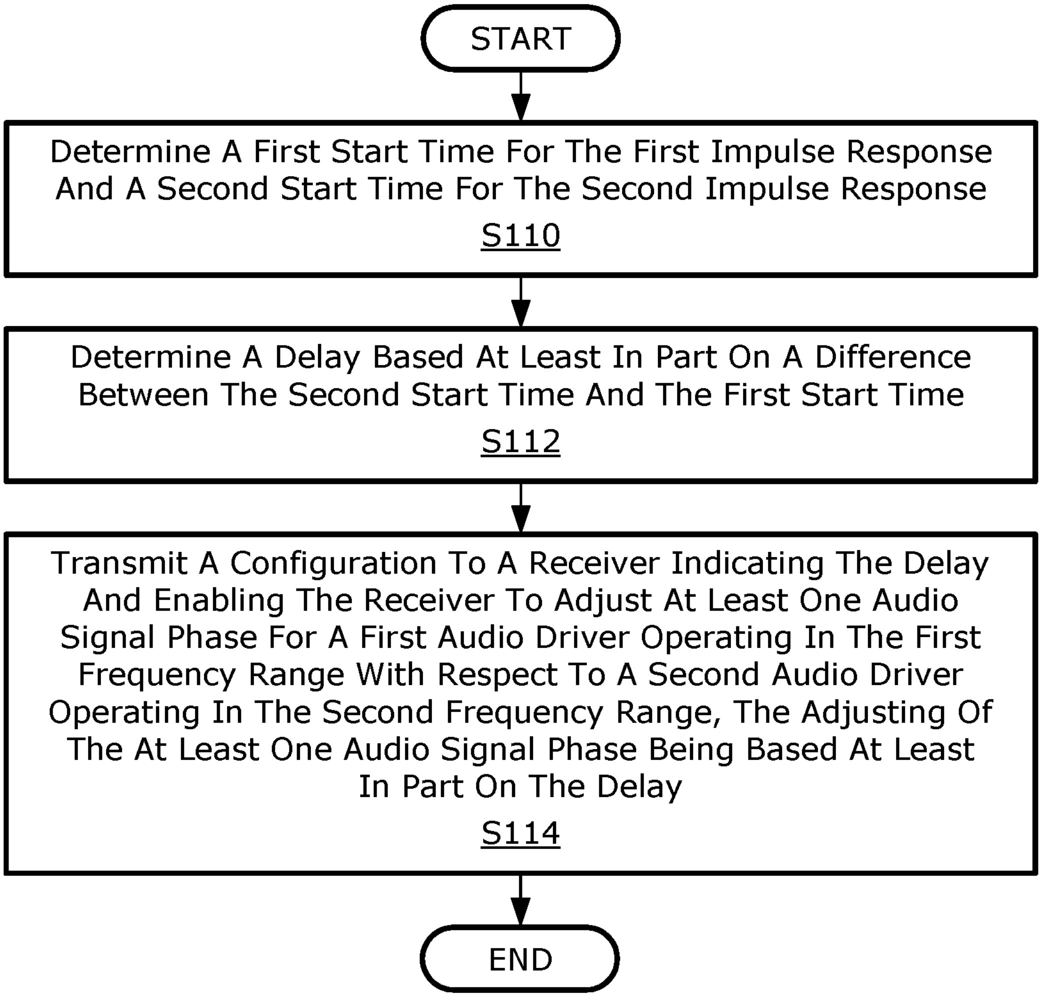
FIG. 13 is a flowchart of an example process in a calibration device according to some embodiments of the present disclosure.

FIG. 13 is a flowchart of an example process in a calibration device 20 according to one or more embodiments of the present invention. One or more blocks described herein may be performed by one or more elements of calibration device 20 such as by one or more of microphone 22, communication interface 28, processing circuitry 30 (including the calibration unit 24), processor 32, etc. Calibration device 20 configured to determine (Block S110) a first start time for the first impulse response and a second start time for the second impulse response, determine (Block S112) a delay based at least in part on a difference between the second start time and the first start time, and transmit (Block S114) a configuration to a receiver 18 indicating the delay and enabling the receiver to adjust at least one audio signal phase for a first audio driver 16 operating in the first frequency range with respect to a second audio driver 16 operating in the second frequency range, the adjusting of the at least one audio signal phase being based at least in part on the delay.

In some embodiments, the calibration device 20 is further configured to equalize a magnitude of the first impulse response and a magnitude of the second impulse response prior to determining the delay.

In some embodiments, the delay is further determined based on a difference between the first start time and a reference start time of a model impulse response associated with at least one of the first frequency range and the second frequency range.

In some embodiments, the first frequency range is a subwoofer frequency range, and the second frequency range is a midrange frequency range.

In some embodiments, the calibration device 20 is further configured to generate a first reference audio signal associated with the first frequency range for playback a first loudspeaker 14 associated with the first audio driver 16 and a second reference audio signal associated with the second frequency range for playback on a second loudspeaker 14 associated with the second audio driver 16, transmit the first reference audio signal and the second reference audio signal to the receiver 18 enabling the receiver 18 to cause playback of the first reference audio signal on the first loudspeaker 14 and the second reference audio signal on the second loudspeaker 14, measure the playback of the first loudspeaker 14 to determine the first impulse response, and measure the playback of the second loudspeaker 14 to determine the second impulse response.

According to one or more embodiments of this aspect, the calibration device 18 is configured to determine the first start time of the first impulse response signal by determining a baseline noise level associated with the first frequency range, and detecting, at the first start time, a rise in the first impulse response signal over the baseline noise level, the rise being at least as large as a predetermined threshold value.

Some Examples

Example A1. A method for phase alignment of audio signals using a first impulse response signal associated with a first frequency range and a second impulse response signal associated with a second frequency range, the method comprising:

- determining a first start time for the first impulse response and a second start time for the second impulse response;
- determining a delay based at least in part on a difference between the second start time and the first start time; and
- adjusting at least one audio signal phase for a first audio driver operating in the first frequency range with respect to a second audio driver operating in the second frequency range, the adjusting of the at least one audio signal phase being based at least in part on the determined delay.

Example A2. The method of Example A1, wherein the method further comprises:

- equalizing the magnitudes of the first impulse response and the second impulse response prior to determining the delay.

Example A3. The method of any one of Examples A1 and A2, wherein the delay is further determined based on a difference between the first start time and a reference start time of a model impulse response associated with at least one of the first frequency range and the second frequency range.

Example A4. The method of any one of Examples A1-A3, wherein the first frequency range is a subwoofer frequency range, and the second frequency range is a midrange frequency range.

Example A5. The method of any one of Examples A1-A4, wherein the method further comprises:

- generating a first reference audio signal associated with the first frequency range for playback on the first loudspeaker 14 and a second reference audio signal associated with the second frequency range for playback on the second loudspeaker 14; and
- measuring the playback of the first loudspeaker 14 to determine the first impulse response and measuring the playback of the second loudspeaker 14 to determine the second impulse response.

Example A6. The method of any one of Examples A1-A5, wherein the determining of the first start time of the first impulse response signal includes:

- determining a baseline noise level (i.e., baseline ambient noise level, acoustic noise floor, etc.) associated with the first frequency range; and
- detecting, at the first start time, a rise in the first impulse response signal over the baseline signal level, the rise being at least as large as a predetermined threshold value.

Example B1. A system 10 for phase alignment of audio signals using a first impulse response signal associated with a first frequency range and a second impulse response signal associated with a second frequency range, the system comprising:

- a calibration device 20, the calibration device 20 comprising processing circuitry 30 configured to:
  - determine a first start time for the first impulse response and a second start time for the second impulse response;
  - determine a delay based at least in part on a difference between the second start time and the first start time;
  - cause transmission of a configuration to a receiver 18 indicating the delay;
- a receiver 18, the receiver 18 comprising processing circuitry 42 configured to:
  - receive the configuration from the calibration device 20; and
  - responsive to receiving the configuration, adjust at least one audio signal phase for a first audio driver 16 operating in the first frequency range with respect to a second audio driver 16 operating in the second frequency range, the adjusting of the at least one audio signal phase being based at least in part on the delay.

Example B2. The system 10 of Example B1, wherein the processing circuitry 30 of the calibration device is further configured to:

equalize the magnitudes of the first impulse response and the second impulse response prior to determining the delay.

Example B3. The system 10 of any one of Examples B1 and B2, wherein the delay is further determined based on a difference between the first start time and a reference start time of a model impulse response associated with at least one of the first frequency range and the second frequency range.

Example B4. The system 10 of any one of Examples B1-B3, wherein the first frequency range is a subwoofer frequency range, and the second frequency range is a midrange frequency range.

Example B5. The system 10 of any one of Examples B1-B4, wherein:

the processing circuitry 42 of the receiver 18 is further configured to:

generate and/or receive a first reference audio signal associated with the first frequency range for playback on the first loudspeaker 14 and a second reference audio signal associated with the second frequency range for playback on the second loudspeaker 14; and the processing circuitry 30 of the calibration device 20 is further configured to:

measure the playback of the first loudspeaker 14 to determine the first impulse response; and measure the playback of the second loudspeaker 14 to determine the second impulse response.

Example B6. The system 10 of any one of Examples B1-B5, wherein the determining of the first start time of the first impulse response signal includes:

determining a baseline noise level (i.e., baseline ambient noise level, acoustic noise floor, etc.) associated with the first frequency range; and detecting, at the first start time, a rise in the first impulse response signal over the baseline signal level, the rise being at least as large as a predetermined threshold value.

It will be appreciated by persons skilled in the art that the present embodiments are not limited to what has been particularly shown and described herein above. In addition, unless mention was made above to the contrary, it should be noted that all of the accompanying drawings are not to scale. A variety of modifications and variations are possible in light of the above teachings and the following claims.

What is claimed is:

1. A method for phase alignment of audio signals using a first impulse response signal associated with a first frequency range and a second impulse response signal associated with a second frequency range, the method comprising:

determining a first start time for the first impulse response and a second start time for the second impulse response, wherein determining the first start time includes:

determining a baseline noise level associated with the first frequency range; and detecting a rise in the first impulse response signal above the baseline noise level, the rise being at least as large as a predetermined threshold value, wherein a time corresponding to the detected rise defines the first start time;

determining a delay based at least in part on a difference between the second start time and the first start time; and adjusting at least one audio signal phase for a first audio driver operating in the first frequency range with respect to a second audio driver operating in the second frequency range, the adjusting of the at least one audio signal phase being based at least in part on the determined delay.

2. The method of claim 1, wherein the method further comprises:

equalizing a magnitude of the first impulse response and a magnitude of the second impulse response prior to determining the delay.

3. The method of claim 1, wherein the delay is further determined based on a difference between the first start time and a reference start time of a model impulse response associated with at least one of the first frequency range and the second frequency range.

4. The method of claim 1, wherein the first frequency range is a subwoofer frequency range, and the second frequency range is a midrange frequency range.

5. The method of claim 1, wherein the method further comprises:

generating a first reference audio signal associated with the first frequency range for playback on a first loudspeaker associated with the first audio driver and a second reference audio signal associated with the second frequency range for playback on a second loudspeaker associated with the second audio driver; and measuring the playback of the first loudspeaker to determine the first impulse response and measuring the playback of the second loudspeaker to determine the second impulse response.

6. A system for phase alignment of audio signals using a first impulse response signal associated with a first frequency range and a second impulse response signal associated with a second frequency range, the system comprising:

a calibration device, the calibration device comprising processing circuitry configured to:

determine a first start time for the first impulse response and a second start time for the second impulse response, wherein determining the first start time includes:

determining a baseline noise level associated with the first frequency range; and detecting a rise in the first impulse response signal above the baseline noise level, the rise being at least as large as a predetermined threshold value, wherein a time corresponding to the detected rise defines the first start time; and determine a delay based at least in part on a difference between the second start time and the first start time;

cause transmission of a configuration to a receiver indicating the delay; and a receiver, the receiver comprising processing circuitry configured to:

receive the configuration from the calibration device; and responsive to receiving the configuration, adjust at least one audio signal phase for a first audio driver operating in the first frequency range with respect to a second audio driver operating in the second frequency range, the adjusting of the at least one audio signal phase being based at least in part on the delay.

7. The system of claim 6, wherein the processing circuitry of the calibration device is further configured to:

equalize a magnitude of the first impulse response and a magnitude of the second impulse response prior to determining the delay.

8. The system of claim 6, wherein the delay is further determined based on a difference between the first start time and a reference start time of a model impulse response associated with at least one of the first frequency range and the second frequency range.

9. The system of claim 6, wherein the first frequency range is a subwoofer frequency range, and the second frequency range is a midrange frequency range.

10. The system of claim 6, wherein:

the processing circuitry of the calibration device is further configured to:

generate a first reference audio signal associated with the first frequency range for playback on a first loudspeaker associated with the first audio driver and a second reference audio signal associated with the second frequency range for playback on a second loudspeaker associated with the second audio driver;

the processing circuitry of the receiver being further configured to:

receive the first reference audio signal and the second reference audio signal; and cause playback of the first reference audio signal on the first loudspeaker and the second reference audio signal on the second loudspeaker; and the processing circuitry of the calibration device being further configured to:

measure the playback of the first loudspeaker to determine the first impulse response; and measure the playback of the second loudspeaker to determine the second impulse response.

11. A calibration device for phase alignment of audio signals using a first impulse response signal associated with a first frequency range and a second impulse response signal associated with a second frequency range, the calibration device comprising processing circuitry configured to:

determine a first start time for the first impulse response and a second start time for the second impulse response, wherein determining the first start time includes:

determining a baseline noise level associated with the first frequency range; and detecting a rise in the first impulse response signal above the baseline noise level, the rise being at least as large as a predetermined threshold value, wherein a time corresponding to the detected rise defines the first start time;

determine a delay based at least in part on a difference between the second start time and the first start time; and cause transmission of a configuration to a receiver indicating the delay and enabling the receiver to adjust at least one audio signal phase for a first audio driver operating in the first frequency range with respect to a second audio driver operating in the second frequency range, the adjusting of the at least one audio signal phase being based at least in part on the delay.

12. The calibration device of claim 11, wherein the processing circuitry of the calibration device is further configured to:

equalize a magnitude of the first impulse response and a magnitude of the second impulse response prior to determining the delay.

13. The calibration device of claim 11, wherein the delay is further determined based on a difference between the first start time and a reference start time of a model impulse response associated with at least one of the first frequency range and the second frequency range.

14. The calibration device of claim 11, wherein the first frequency range is a subwoofer frequency range, and the second frequency range is a midrange frequency range.

15. The calibration device of claim 11, wherein the processing circuitry of the calibration device is further configured to:

generate a first reference audio signal associated with the first frequency range for playback a first loudspeaker associated with the first audio driver and a second reference audio signal associated with the second frequency range for playback on a second loudspeaker associated with the second audio driver;

cause transmission of the first reference audio signal and the second reference audio signal to the receiver enabling the receiver to cause playback of the first reference audio signal on the first loudspeaker and the second reference audio signal on the second loudspeaker;

measure the playback of the first loudspeaker to determine the first impulse response; and measure the playback of the second loudspeaker to determine the second impulse response.

* * * * *